(12) United States Patent
Watson

(10) Patent No.: US 10,513,380 B2
(45) Date of Patent: Dec. 24, 2019

(54) HYBRID FASTENER STRAP HAVING POSITIONING DETENTS

(71) Applicant: James Watson, Arlington, VA (US)

(72) Inventor: James Watson, Arlington, VA (US)

( * ) Notice: Subject to any disclaimer, the term of this patent is extended or adjusted under 35 U.S.C. 154(b) by 143 days.

(21) Appl. No.: 15/472,634

(22) Filed: Mar. 29, 2017

(65) Prior Publication Data

US 2018/0282036 A1  Oct. 4, 2018

(51) Int. Cl.
*B65D 63/10* (2006.01)
*B65D 63/02* (2006.01)

(52) U.S. Cl.
CPC .... *B65D 63/1027* (2013.01); *B65D 2563/103* (2013.01); *Y02W 90/12* (2015.05); *Y10T 24/141* (2015.01); *Y10T 24/1498* (2015.01)

(58) Field of Classification Search
CPC .......... B65D 63/1027; B65D 2563/103; B65D 2563/105; B65D 2563/106; B65D 2563/101; B65D 63/00; Y10T 24/1498; Y10T 24/141
See application file for complete search history.

(56) References Cited

U.S. PATENT DOCUMENTS

| | | | |
|---|---|---|---|
| 3,597,803 A * | 8/1971 | Van Neil | B65D 63/1027 24/16 PB |
| 3,605,199 A | 9/1971 | Eberhardt | |
| 4,993,669 A | 2/1991 | Dyer | |
| 5,317,787 A * | 6/1994 | Fortsch | B65D 63/1072 24/16 PB |
| 5,584,452 A * | 12/1996 | Koike | F16L 3/127 24/16 PB |
| 5,774,944 A | 7/1998 | Choi | |
| 5,836,053 A | 11/1998 | Davignon | |
| 6,347,434 B1 * | 2/2002 | Newman | B65D 63/1063 24/16 PB |
| 6,550,723 B2 | 4/2003 | Fraley, II | |
| 6,560,822 B2 | 5/2003 | Caveney | |
| 7,131,168 B2 | 11/2006 | Pangallo | |
| 7,774,905 B2 | 8/2010 | Geiger | |
| 8,127,779 B2 | 3/2012 | Shinzato | |
| 9,039,209 B1 | 5/2015 | Johnston | |
| 9,340,340 B2 | 5/2016 | Beckman | |
| 2012/0131767 A1 * | 5/2012 | Zhang | B65D 63/1054 24/16 PB |
| 2014/0259543 A1 * | 9/2014 | Scott | B65D 63/1027 24/16 PB |

* cited by examiner

*Primary Examiner* — Robert Sandy
*Assistant Examiner* — Michael S Lee
(74) *Attorney, Agent, or Firm* — Juneau & Mitchell IP Law Firm; Todd Juneau

(57) ABSTRACT

The present invention relates to one-piece fasteners having a strap and a locking head utilized to secure elongate objects such as cables in a bundle, and in particular, to hybrid fasteners having both raised detents and locking teeth as part of the fastener strap.

17 Claims, 15 Drawing Sheets

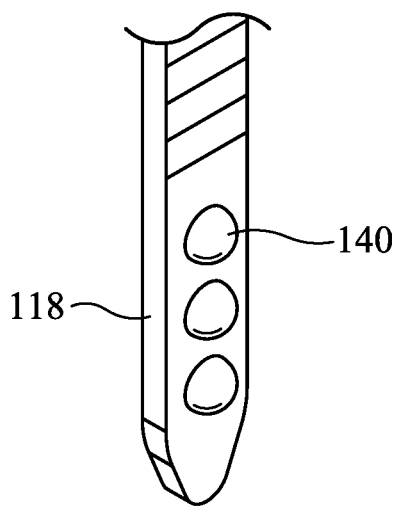 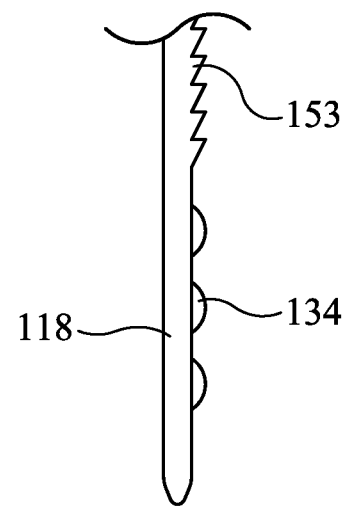
FIG. 6A              FIG. 6B
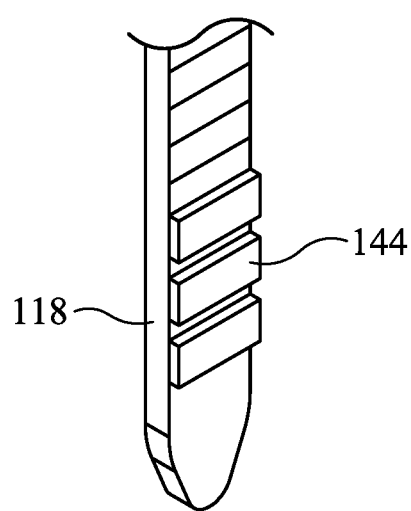 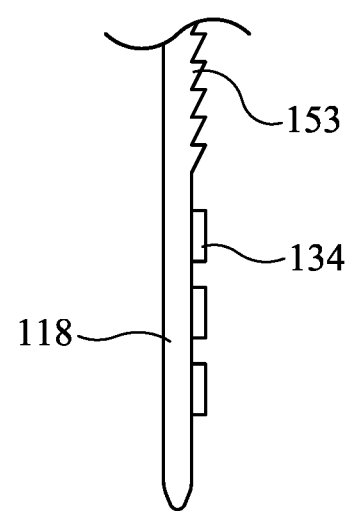
FIG. 7A              FIG. 7B

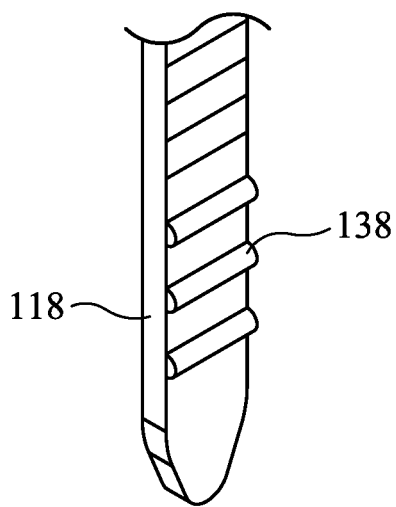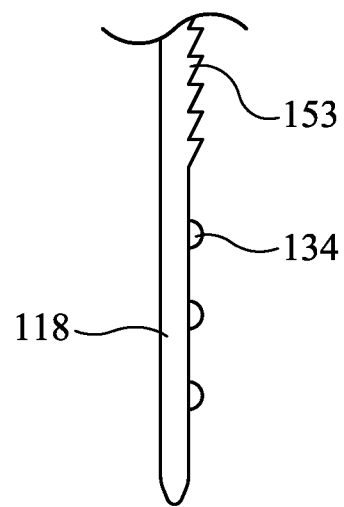
FIG. 8A    FIG. 8B
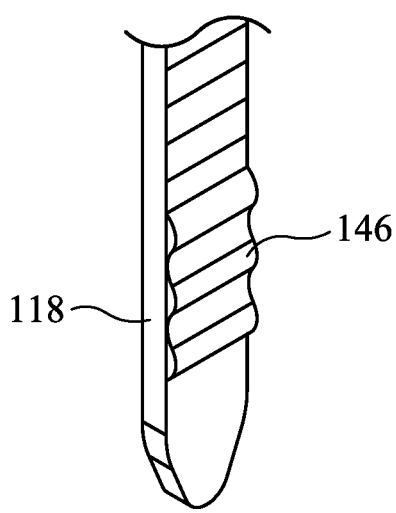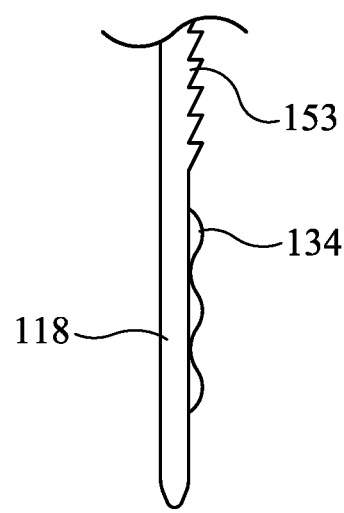
FIG. 9A    FIG. 9B

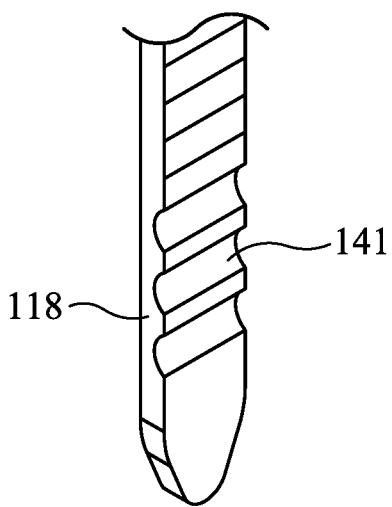 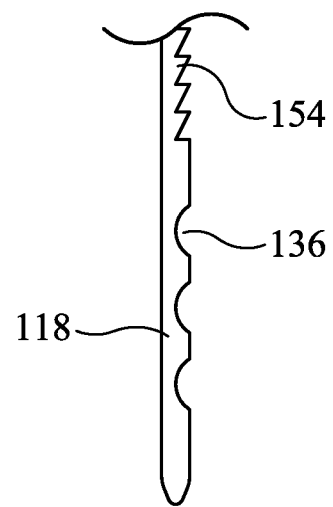
FIG. 16A  FIG. 16B
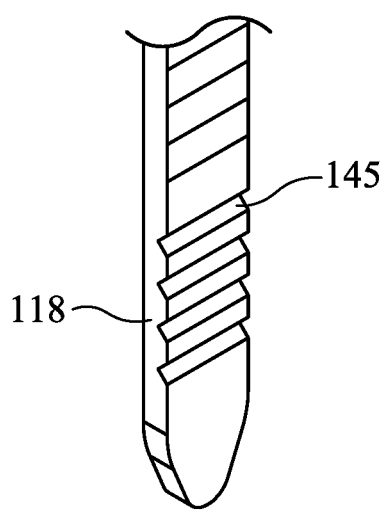 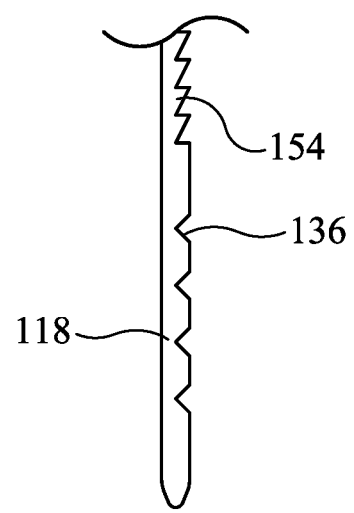
FIG. 17A  FIG. 17B

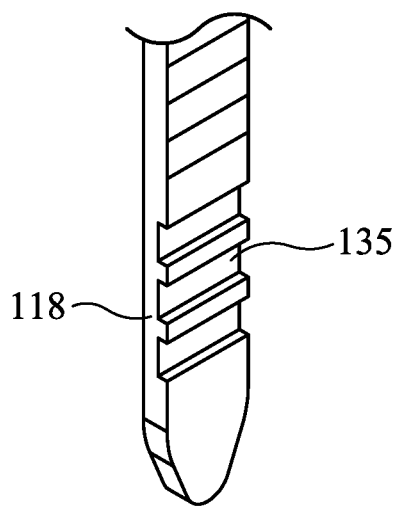
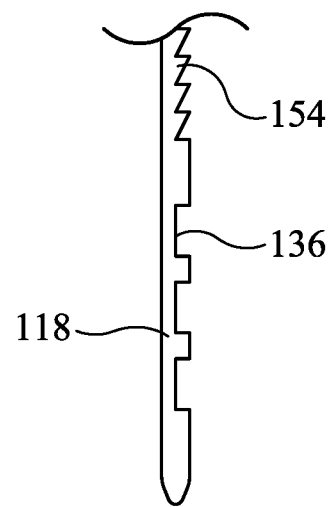
FIG. 18A
FIG. 18B
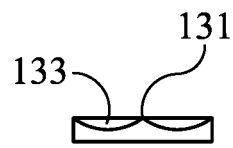
FIG. 19C
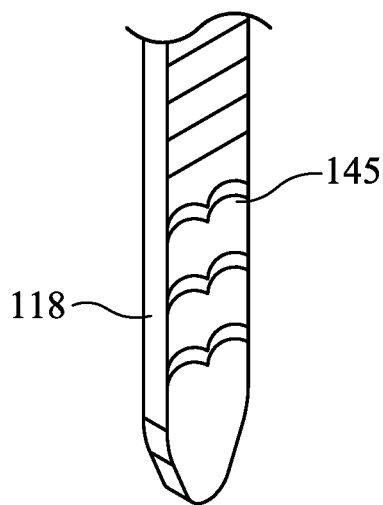
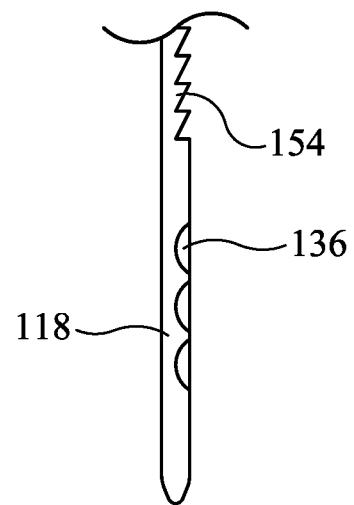
FIG. 19A
FIG. 19B

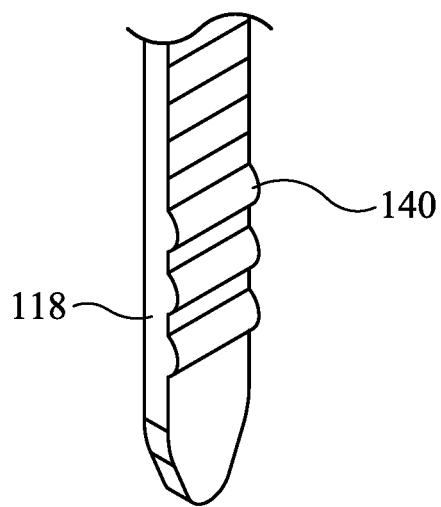
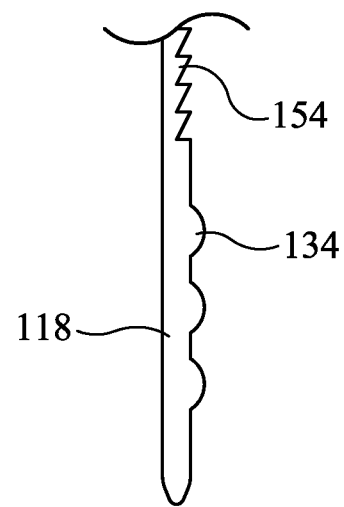
FIG. 28A  FIG. 28B
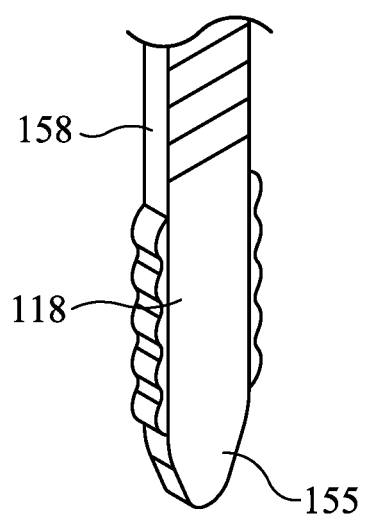
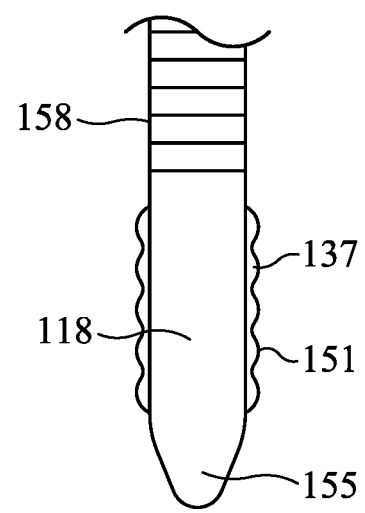
FIG. 29A  FIG. 29B

HYBRID FASTENER STRAP HAVING POSITIONING DETENTS

BACKGROUND

Field of the Invention

The present invention relates to one-piece fasteners having a strap and a locking head utilized to secure elongate objects such as cables in a bundle, and in particular, to hybrid fasteners having both positioning detents and locking teeth as part of the fastener strap.

Background of the Invention

Zip ties are commonly used to bind together wires, hoses, tubes, and other objects to secure their location, restrict their motion, or reduce/eliminate chaff. A zip tie consists of a band of various lengths and widths, generally made of flat, straight, stiff, strong, plastic. The zip tie band contains a ratchet-and-teeth mechanism that allows the tab of the band to be inserted into the receiver of the band, and moved in only a single direction to make the zip tie loop shorter. Once the tab is put into the receiver end, the zip tie is lock and can only be shortened. The zip tie is not reversible whereby it can be lengthened, unlocked, or undone; the zip tie can only be removed by cutting the zip tie.

Some applications that would benefit from using zip ties are hindered by accessibility of the location whereby the user is limited by reach or space to using a single hand. Examples include reaching into a narrow space, such as on a boat or RV or car, to secure wires or hoses.

Some applications that would benefit from using zip ties require the user to use one hand for stability and limit application of the zip tie to the other hand. Examples include binding equipment on a boat that is underway.

Some users of zip ties have dexterity limitations or other handicaps that limit their ability to use both hands, and hence need to apply the zip tie with a single hand. Examples include an amputee performing a home repair to secure wires.

The zip tie irreversibility is a desirable quality once the zip tie application is confirmed, but can interfere with the initial attempts to apply the zip tie to the correct objects in the correct location. Examples include a conduit of several close-by wires where only some of the wires should be enclosed by the zip tie.

SUMMARY OF THE INVENTION

To solve the problems associated manipulating a zip tie in situations requiring a single-hand or a trial-and-error application, this invention describes several improvements to a zip tie.

The zip tie band is pre-curled into a loop whereby the natural position of the zip tie puts the tab in proximity to the receiver.

The zip tie receiver has a tapered mouth to allow for the tab to be guided into the receiver with some variance in the alignment of the tab and receiver.

The tab end of the band starts with rounded teeth that are reversible in the receiver ratchet mechanism to allow the installation of the zip tie to be verified before it is shortened into the traditional non-reversible locking teeth on the band.

In one preferred embodiment, there is provided a hybrid fastener, comprising: (a) an elongate flexible strap having a plurality of transversely arranged abutments disposed longitudinally along at least a portion of the elongate flexible strap; (b) at least one positioning detent disposed at a second end of the elongate flexible strap; and (c) a receiver head at a first end of the elongate flexible strap, the receiver head having a frame defining an inner aperture and a pawl that extends partially into the aperture; wherein when the second end of the elongate flexible strap is inserted into the receiver head to form a loop with the elongate flexible strap, the at least one positioning detent is configured to releasably engage the pawl, and when the elongate flexible strap is inserted further into the receiver head, the plurality of transversely arranged abutments are configured to lock against the pawl.

In another preferred embodiment, there is provided a hybrid fastener, wherein the elongate flexible strap has a channel within one surface of the elongate flexible strap, and the plurality of transversely arranged abutments are disposed within the channel.

In another preferred embodiment, there is provided a hybrid fastener, wherein the at least one positioning detent is configured to have a profile shape selected from a circular profile, a parabolic profile, a triangular profile, a flat-topped profile, a sinusoidal profile, a channeled profile, a complex curvilinear profile, and a polygonal profile.

In another preferred embodiment, there is provided a hybrid fastener, wherein the aperture defined by the frame of the receiver head is funnel-shaped in a single planar axis.

In another preferred embodiment, there is provided a hybrid fastener, wherein the aperture defined by the frame of the receiver head is funnel-shaped in a first planar axis and funnel shaped in a second planar axis, defining a vortex shape.

In another preferred embodiment, there is provided a hybrid fastener, wherein the abutments extend along a majority of the strap.

In another preferred embodiment, there is provided a hybrid fastener, wherein the elongated flexible strap ranges from 5 cm-100 cm in length.

In another preferred embodiment, there is provided a hybrid fastener, wherein the elongated flexible strap ranges in length from 5 mm-200 mm.

In another preferred embodiment, there is provided a hybrid fastener, wherein the elongated flexible strap ranges from 0.5 cm-5 cm in width and 0.05-0.5 cm in thickness.

In another preferred embodiment, there is provided a hybrid fastener, wherein the elongated flexible strap ranges in width from 5 mm-200 mm.

In another preferred embodiment, there is provided a hybrid fastener, wherein the elongated flexible straps are constructed of thermo plastic polymer, metal, fibers, or combinations thereof.

In another preferred embodiment, there is provided a hybrid fastener, wherein the elongated flexible straps are constructed of a polymer selected from the group consisting of: nylon, polyurethane, polyester, low density polyethylene, high density polyethylene, ultra-high molecular weight polyethylene, polyethylene terephthalate, polypropylene, polystyrene, polyvinyl chloride, polylactic acid, polychlorotrifluoroethylene, polyacrylonitrile, aromatic polyester, liquid crystal polymer, natural rubber, synthetic rubber such as neoprene and butadiene rubber, silicone, polysiloxane, block co-polymer, composite polymer, impregnated polymer, and combinations thereof.

In another preferred embodiment, there is provided a hybrid fastener, wherein the elongated flexible straps are constructed of a metal selected from the group consisting of: steel, copper, aluminum, tin, titanium, nickel, zinc, and alloys thereof.

In another preferred embodiment, there is provided a hybrid fastener, wherein the elongated flexible straps are constructed of a stamped metal, a cut metal, rolled sheet metal, or metal fibers.

In another preferred embodiment, there is provided a hybrid fastener, wherein the elongated flexible straps are constructed of fibers, fibers incorporated into a structural matrix, natural fibers, cellulosic fibers extracted from hemp, cotton, plant leaves, wood or stems, glass fibers, silica fibers, ceramic fibers, metal fibers, and combinations thereof.

Various other features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF DRAWINGS

FIGS. 6A and 6B show a perspective and plan view of an embodiment having positioning detents in a raised button shape, in a strap having raised teeth.

FIGS. 7A and 7B show a perspective and plan view of an embodiment having positioning detents in a raised block shape, in a strap having raised teeth.

FIGS. 8A and 8B show a perspective and plan view of an embodiment having positioning detents in a raised hemispheric shape, in a strap having raised teeth.

FIGS. 9A and 9B show a perspective and plan view of an embodiment having positioning detents in a raised wave or sinusoidal shape, in a strap having raised teeth.

FIGS. 16A and 16B show a perspective and plan view of an embodiment having positioning detents shaped as a series of concave rounded troughs or pits, in a strap having recessed teeth.

FIGS. 17A and 17B show a perspective and plan view of an embodiment having positioning detents shaped as a series of concave triangular troughs or pits, in a strap having recessed teeth.

FIGS. 18A and 18B show a perspective and plan view of an embodiment having positioning detents shaped as a series of concave transverse channel troughs, in a strap having recessed teeth.

FIGS. 19A, 19B and 19C show a perspective view, a plan view, and a head-on cross-sectional view of an embodiment having positioning detents in a complex shape comprising series of concave or recessed rounded inverted arches, rounded from the side, and rounded longitudinally, having a central peaked channel, in a strap having recessed teeth.

FIGS. 28A and 28B show a perspective and plan view of an embodiment having positioning detents in a series (3) of raised rounded shapes in a strap having recessed teeth.

FIGS. 29A and 29B show a perspective and plan view of an embodiment having positioning detents in a series (5) of raised wave or sinusoidal shapes and located on the edge of the strap rather than the inner surface of the strap.

DETAILED DESCRIPTION OF THE INVENTION

Figure 1:
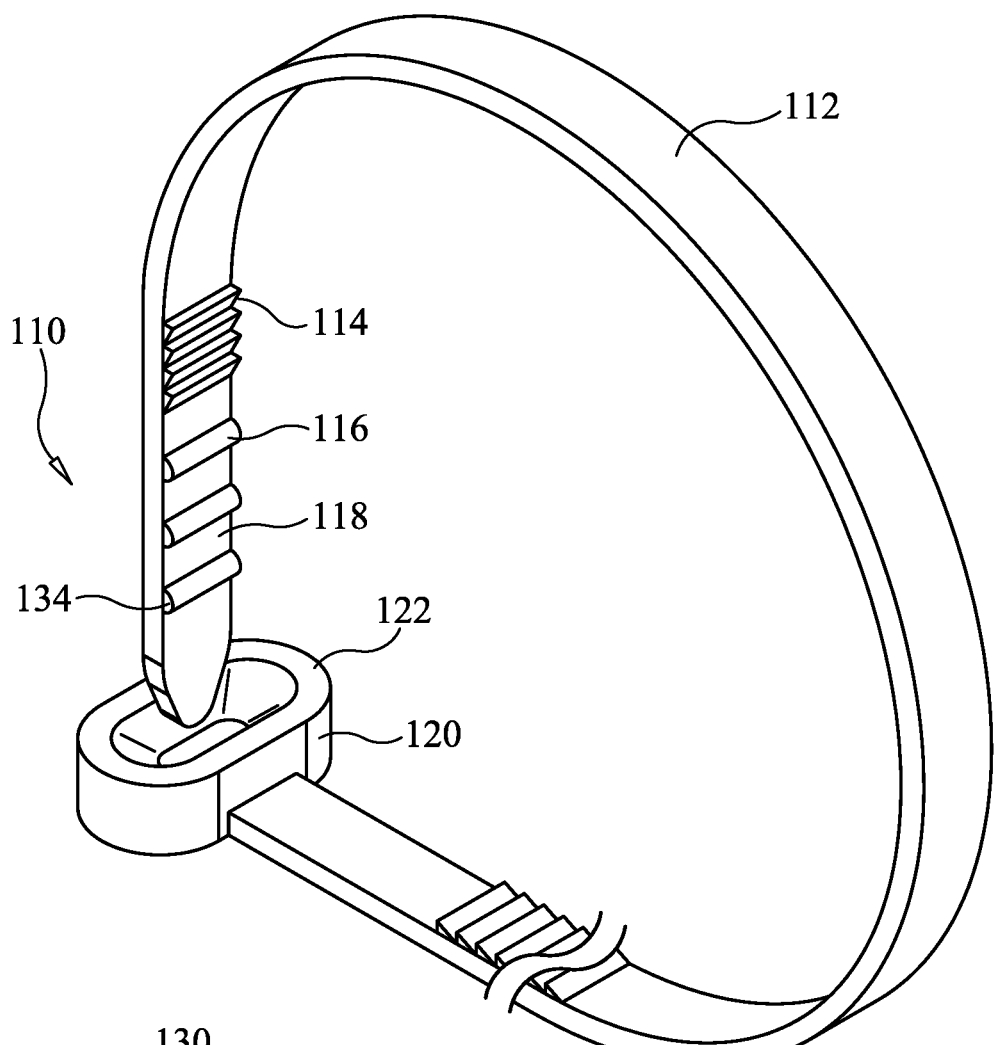
FIG. 1 is a perspective view of an Enhanced Zip Tie in its natural curled, pre-insertion position in a strap having raised teeth.

The embodiments herein and the various features and advantageous details thereof are explained more fully with reference to the non-limiting embodiments that are illustrated in the accompanying drawings and detailed in the following description.

Descriptions of well-known components and processing techniques are omitted so as to not unnecessarily obscure the embodiments herein.

The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art.

Like numbers refer to like elements throughout.

As used herein the term "and/or" includes any and all combinations of one or more of the associated listed items. The terminology used herein is for the purpose of describing particular embodiments only and is not intended to limit the full scope of the invention.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In a preferred embodiment, the invention includes a hybrid fastener that comprises an elongate flexible strap having a plurality of transversely arranged abutments disposed longitudinally along at least a portion of the elongate flexible strap, and a "positioning detent" structure that is part of the strap that temporarily holds the strap in position within the frame of the receiver head by releasably engaging the pawl that extends into the space or aperture defined by the frame of the receiver head, and which can be released by applying a force to remove the second end of the strap from the receiver head.

The term "hybrid" refers to a strap having two or more types of pawl-engaging structures one or both sides of the strap.

The term 'elongate" refers to a strap having a longitudinal aspect that is dominant to the other dimensions, e.g. longer than it is wide or thick. In preferred aspects, the straps range from 5 cm-100 cm in length for e.g. cable ties, industrial uses, conduit, etc. In other preferred aspects, the straps range in length from 5 mm-200 mm for e.g. surgical applications or electronic applications. In other preferred embodiments, the straps range from 0.5 cm-5 cm in width and 0.05-0.5 cm in thickness. In another preferred embodiment, there is provided a hybrid fastener, wherein the elongated flexible strap ranges in width from 5 mm-200 mm.

Straps are constructed of thermo plastic polymer, metal, fibers, and combinations thereof.

The term "polymer" means nylon, polyurethanes, polyesters, low density polyethylenes, high density polyethylenes, ultra-high molecular weight polyethylenes, polyethylene terephthalates, polypropylenes, polystyrenes, polyvinyl chlorides, polyvinylidene polymers including PVDF (fluoride), fluoropolymers including polytetrafluoroethylene and ePFTE, polylactic acid polymers, polychlorotrifluoroethylenes, polyacrylonitrile polymers, aromatic polyesters including liquid crystal polymers, natural rubbers, synthetic rubbers such as neoprene and butadiene rubbers, silicones (polysiloxanes), block co-polymers, composite polymers and impregnated polymers, e.g. silnylon.

The term "metal" means steel, copper, aluminum, tin, titanium, nickel, zinc, and alloys including these such as Nitinol (R), Brass, etc. Metal made be from a stamped, cut or rolled sheet, or made be made from metal and other fibers.

The term "fibers" contemplated as within the scope of the invention include fibers which are incorporated into the structural matrix, and especially naturally occurring fibers, such as cellulosic fibers extracted from hemp, cotton, plant leaves, wood or stems, or fibers made from glass, silica, ceramic, metal, and combinations thereof.

The term "detent" means a structure that is part of the strap that temporarily keeps the strap in position within the frame of the receiver head by releasably engaging the pawl that extends into the space or aperture defined by the frame of the receiver head, and which can be released by applying a force to remove the second end of the strap from the receiver head.

The detent may be made of the same or different material than the strap and/or the abutment teeth. In one preferred aspect, the strap, receiver head, abutment teeth, and positioning detents are formed as an integral (single) piece, e.g. by extrusion, stamping or 3-D printing. The detents may also be made of a slightly harder or softer material than the abutment teeth depending on the application for which the strap is intended.

The term "plurality" means one or more. The phrase "plurality of transversely arranged abutments" that are configured to lock against the pawl refers to teeth or similar structures that are on the surface of the strap or built within a channel of the strap.

It is also contemplated that the abutments and positioning detents may be formed, not on the surface of the strap, but on the edge of the strap, e.g. side-toothed, with the pawl device being disposed in the frame in a location appropriate for engaging the edge-located abutments and edge-located detents.

In one preferred aspect, the detent(s) is configured to have a profile shape selected from a hemispherical-button profile, a cylindrical-button profile, a circular profile, a parabolic profile, a triangular profile, a flat-topped profile, a sinusoidal profile, a channeled profile, a complex curvilinear profile, and a polygonal profile.

The positioning detent may be a raised detent or it may be a concave detent. A raised detent is a detent structured to lay above the surface of the local area of the strap around the raised detent. A concave detent is a detent structured to lay below the surface of the local area of the strap around the concave detent.

For a raised detent, a hemispherical button detent would have the appearance of a shallow dome, and a hemispheric cylinder detent would have the appearance of a disk. A circular profile would have the appearance of a "speed bump" on the strap surface and the rounded aspect would engage the pawl just enough to temporarily hold the strap within the receiver head. Similarly, a parabolic, triangular, or flat topped profile would have the appearance of a variety of "speed humps" or "speed tables", and would also temporarily engage the pawl. A sinusoidal or channeled profile would allow a designer to use either a single center-located pawl or a full-transverse pawl, in order to control the amount of hold force that the detents exert against the pawl.

For a concave detent, the hemispherical button detent would be configured as a bowl or basin, and the concave hemispheric cylinder detent would be configured as a circular pit. For a concave detent, the circular profile would have the appearance of a trough on the strap surface and the rounded aspect would engage the pawl just enough to temporarily hold the strap within the receiver head. Similarly, a parabolic, triangular, or flat bottomed profile would have the appearance of a variety of differently shaped troughs and would also temporarily engage the pawl. A sinusoidal or channeled profile would be configured as a trough with an irregular bottom aspect that engages a single center-located pawl or a full-transverse pawl, in order to control the amount of hold force that the detents exert against the pawl.

Referring now to the FIGURES, FIG. 1, illustrates the described hybrid fastener 110 invention which includes an elongated flexible strap 112 as a semi-stiff plastic band having a plurality of transversely arranged abutments 114, one or more positioning detents 116 on the tip or second end of the strap as a detent tab 118, with receiver head 120.

Elongated flexible strap 112 has a variety of lengths, widths, and thicknesses to provide different sizes and strengths for various applications.

Elongated flexible strap 112 contains two types of pawl engaging structures, e.g. teeth—the plurality of transversely arranged abutments 114 i.e. locking teeth, that are disposed longitudinally along at least a portion of the elongate flexible strap 112. In a preferred aspect, the locking teeth 114 are located along the majority of the elongated flexible strap 112, and the rounded non-locking raised detents 116 located at only the tip or second end of the strap, the detent tab 118.

The receiver head 120 consists of an aperture 126 defined by a frame 122. In one aspect, the aperture 126 may be a taper mouth 128 having the pawl device 124 extending into the space of the opening 126 to facilitate engagement with the locking teeth 114 and the positioning detents 116.

The aperture 126 may be a straight-forward hollow rectangular structure. Alternatively, the aperture 126 can be configured as a funnel either as a horizontal funnel 130, or as a vertical funnel 132, or, having both sides of the internal surface of the receiver head having funnel-shaped interior sidewalls, both horizontal 130 and vertical 132, to guide the strap second end, aka detent tab 118 into frame/locking slot 122 that contains a pawl 124.

The pawl 124 and transverse abutments/locking teeth 114 provide one-direction, irreversible locking action on the elongated flexible strap 112, allowing the strap 112 to only be further pushed into receiver head 120, to be shortened. The elongated flexible strap 112 cannot pull out of the receiver 120 once the abutments 114 are engaged.

The pawl 124 and the positioning detent 116 with its releasable geometry provides reversible, two-direction, action on the elongated flexible strap 112, allowing the elongated flexible strap 112 to be pushed into the receiver head 120 and pulled out of the receiver 120 with a the application of a slight force. While the pawl 124 engages the positioning detent(s) 116, it provides some holding strength to facilitate easy manipulation of the strap 112 using one hand to gather, e.g. cables or other elongated items, to temporarily lock the strap 112 in place using a single hand, and then provide the ability to remove the hand, grasp the threaded end 118 of the strap 112, and pull the loop closed to engage the abutments 114 and lock the strap 112 in a closed position.

Figure 2:
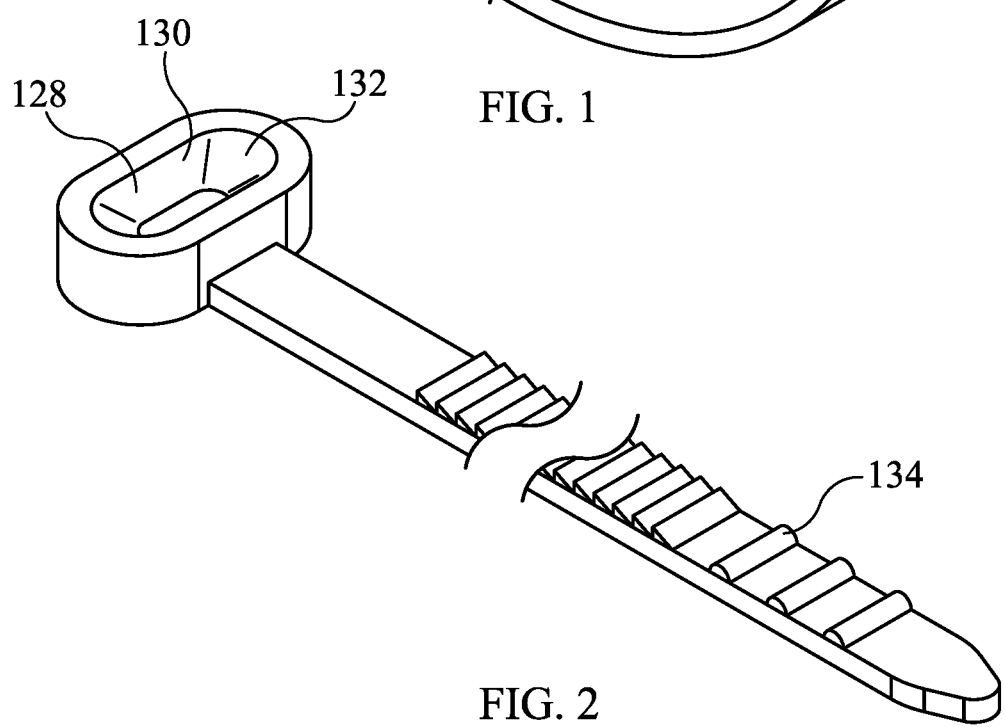
FIG. 2 is a perspective view thereof with the Enhanced Zip Tie pulled flat.

FIG. 2 is a perspective view thereof with the Enhanced Zip Tie pulled flat. FIG. 2 shows taper mouth 128 having horizontal funnel 130 and horizontal funnel 132 within the aperture 126 of receiver head 120. FIG. 2 illustrates a raised detent located on the detent tab 118 section of the elongated flexible strap 112.

Figure 3:
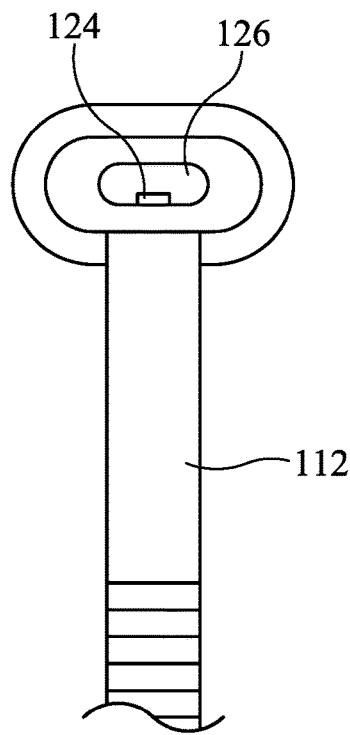
FIG. 3 is a front plane view thereof pulled flat to show detail in the tab and rounded teeth, and the receiver and tapered mouth.

FIG. 3 is a front plane view thereof pulled flat to show detail in the tab and rounded teeth, and the receiver and tapered mouth. FIG. 3 shows aperture 126 having pawl 124 disposed within. Elongated strap 112 is shown having a plurality of transversely arranged abutments 114, and having positioning detent(s) 116 located at the tip or second end, the detent tab 118, of the elongated strap 112.

Figure 4:
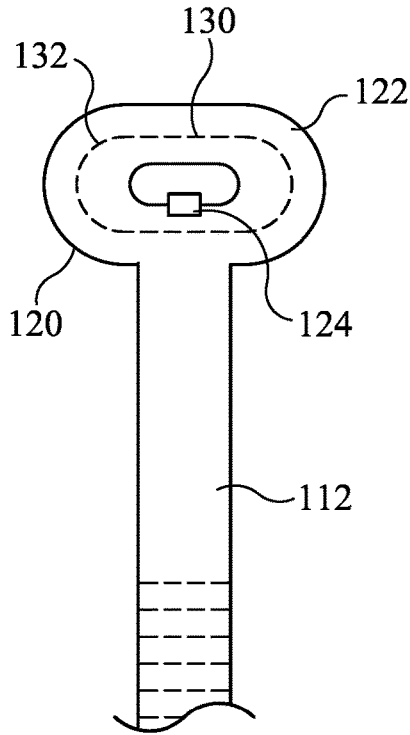
FIG. 4 is a rear plane view thereof pulled flat to show detail in the receiver and tapered mouth.

FIG. 4 is a rear plane view thereof pulled flat to show detail in the receiver and tapered mouth. FIG. 4 show vertical funnel 132 structure line and horizontal funnel 130 structure line from reverse. Pawl 124 is shown with frame 122 of the receiver head 120.

Figure 5:
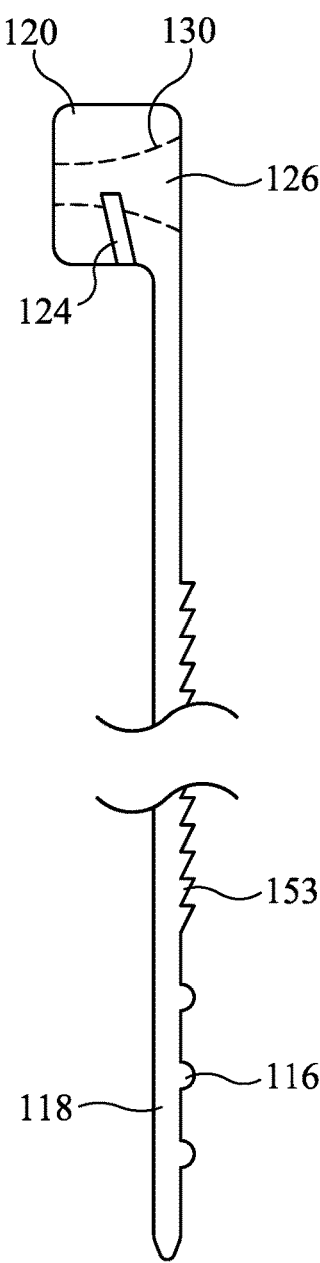
FIG. 5 is a left plane view thereof pulled flat to show detail in the receiver, the tapered mouth, in the tab, and rounded positioning detents, in a strap having raised teeth. Given the symmetry of this embodiment, the right plane view is identical.

FIG. 5 is a left plane view thereof pulled flat to show detail in the receiver 120, the tapered mouth 128, the pawl 124 within the aperture 126. The detent tab 118 is shown having rounded positioning detents 116, in a strap having teeth 114 that are raised teeth 153.

The following figures illustrate non-limiting preferred embodiments of the detent tab 118.

FIGS. 6A and 6B show a perspective and plan view of an embodiment having raised positioning detents 134 in a raised button shape 140, in a strap having raised teeth 153.

FIGS. 7A and 7B show a perspective and plan view of an embodiment of the detent tab 118 having raised positioning detents 134 in a raised block shape 144, in a strap having raised teeth 153.

FIGS. 8A and 8B show a perspective and plan view of an embodiment of the detent tab 118 having raised positioning detents 134 in a raised hemispheric shape 138, in a strap having raised teeth 153.

FIGS. 9A and 9B show a perspective and plan view of an embodiment of the detent tab 118 having raised positioning detents 134 in a raised wave or sinusoidal shape 146, in a strap having raised teeth 153.

Figure 10A:
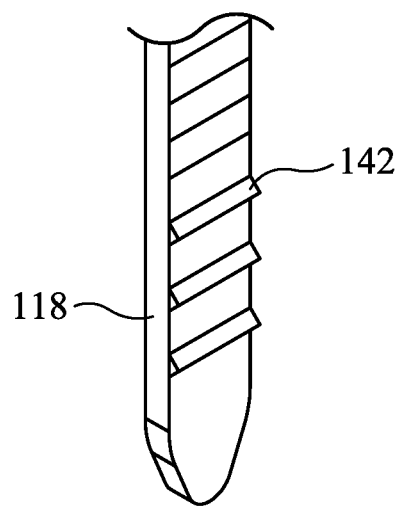
FIGS. 10A and 10B show a perspective and plan view of an embodiment having positioning detents in a raised triangular shape, in a strap having raised teeth.
Figure 10B:
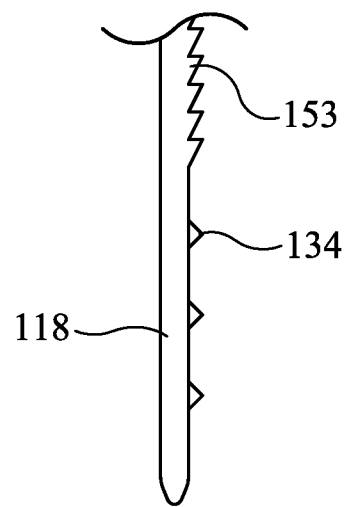

FIGS. 10A and 10B show a perspective and plan view of an embodiment of the detent tab 118 having raised positioning detents 134 in a raised triangular shape 142, in a strap having raised teeth 153.

Figure 11A:
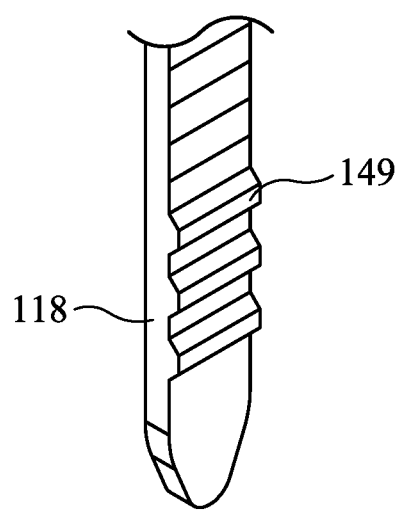
FIGS. 11A and 11B show a perspective and plan view of an embodiment having positioning detents in a raised trapezoidal shape, in a strap having raised teeth.
Figure 11B:
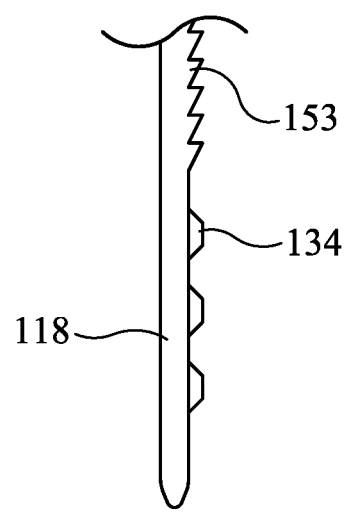

FIGS. 11A and 11B show a perspective and plan view of an embodiment of the detent tab 118 having raised positioning detents 134 in a raised trapezoidal shape 149, in a strap having raised teeth 153.

Figure 12A:
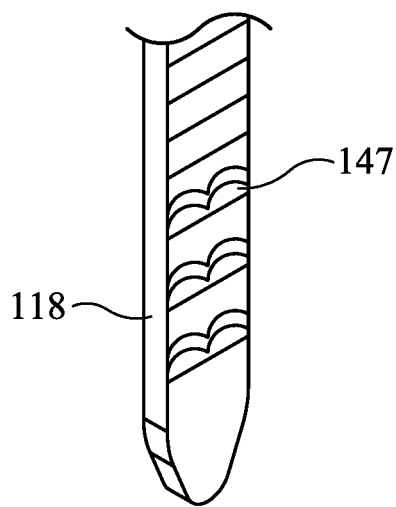
FIGS. 12A, 12B and 12C show a perspective view, a plan view, and a head-on cross-sectional view of an embodiment of the detent tab having raised positioning detents in a complex shape comprising series of rounded or pillowed arches, rounded from the side, and rounded longitudinally, having a central lowered channel, in a strap having raised teeth.
Figure 12B:
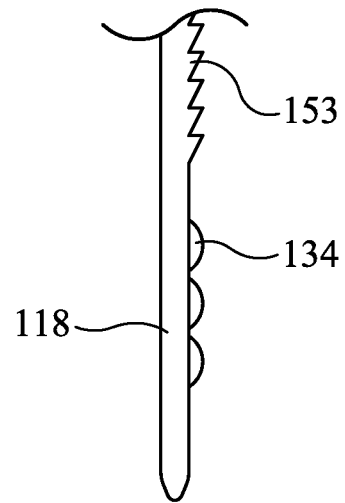
Figure 12C:
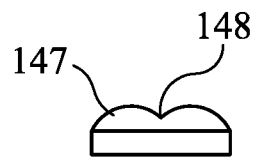

FIGS. 12A, 12B and 12C show a perspective view, a plan view, and a head-on cross-sectional view of an embodiment of the detent tab 118 having raised positioning detents 134 in a complex shape comprising series of rounded or pillowed arches 147, rounded from the side, and rounded longitudinally, having a central lowered channel 148, in a strap having raised teeth 153.

Figure 13A:
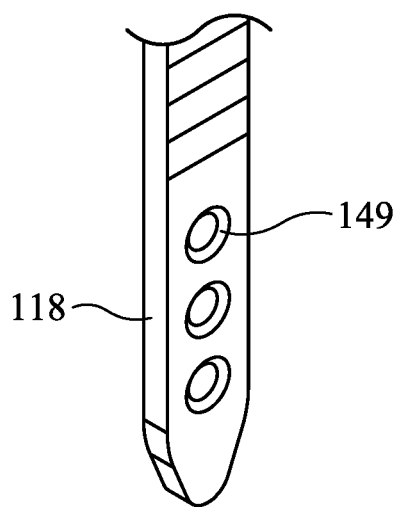
FIGS. 13A and 13B show a perspective and plan view of an embodiment having positioning detents in a recessed or concave bowl shape, in a strap having recessed teeth.
Figure 13B:
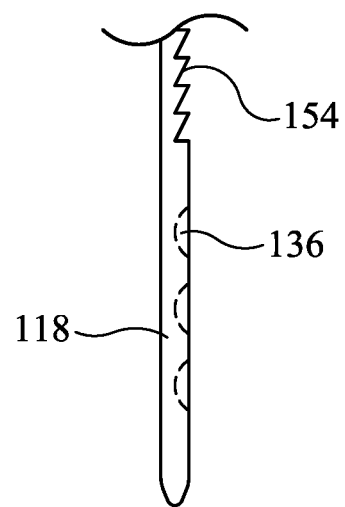

FIGS. 13A and 13B show a perspective and plan view of an embodiment of the detent tab 118 having recessed positioning detents 136 in a recessed or concave bowl shape 141, in a strap having teeth 114 that are recessed teeth 154.

Figure 14A:
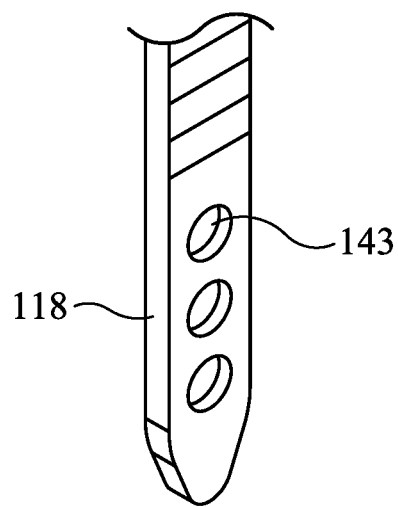
FIGS. 14A and 14B show a perspective and plan view of an embodiment having positioning detents in a recessed or concave cylinder shape, in a strap having recessed teeth.
Figure 14B:
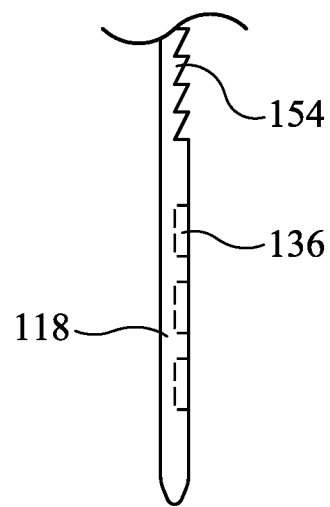

FIGS. 14A and 14B show a perspective and plan view of an embodiment of the detent tab 118 having recessed positioning detents 136 in a recessed or concave cylinder shape 143, in a strap having recessed teeth 154.

Figure 15A:
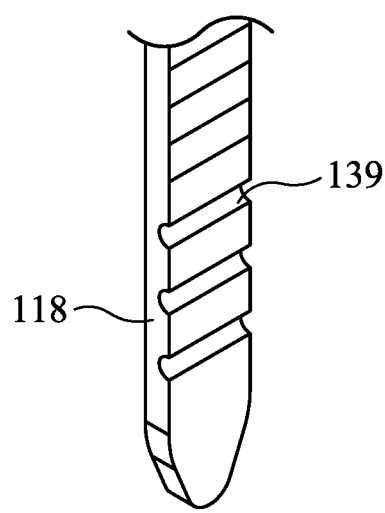
FIGS. 15A and 15B show a perspective and plan view of an embodiment having positioning detents shaped as a series of concave hemispherical troughs or pits, in a strap having recessed teeth.
Figure 15B:
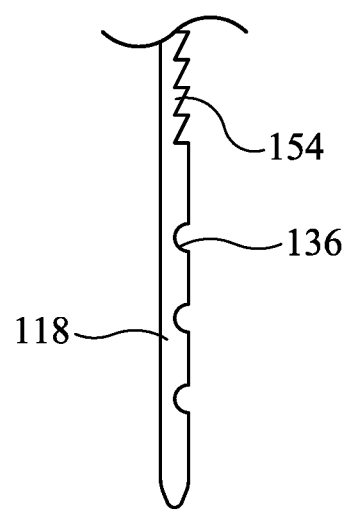

FIGS. 15A and 15B show a perspective and plan view of an embodiment of the detent tab 118 having recessed positioning detents 136 shaped as a series of concave hemispherical troughs or pits 139, in a strap having recessed teeth 154.

FIGS. 16A and 16B show a perspective and plan view of an embodiment of the detent tab 118 having recessed positioning detents 136 shaped as a series of concave parabolic troughs or pits 141, in a strap having recessed teeth 154.

FIGS. 17A and 17B show a perspective and plan view of an embodiment of the detent tab 118 having recessed positioning detents 136 shaped as a series of concave triangular troughs or pits 145, in a strap having recessed teeth 154.

FIGS. 18A and 18B show a perspective and plan view of an embodiment of the detent tab 118 having recessed positioning detents 136 shaped as a series of concave transverse channel troughs 135, in a strap having recessed teeth 154.

FIGS. 19A, 19B and 19C show a perspective view, a plan view, and a head-on cross-sectional view of an embodiment of the detent tab 118 having recessed positioning detents 136 in a complex shape comprising series of concave or recessed rounded inverted arches 133, rounded from the side, and rounded longitudinally, having a central peak 131 in the recessed inverted arch channel 133, in a strap having recessed teeth 154.

Figure 20A:
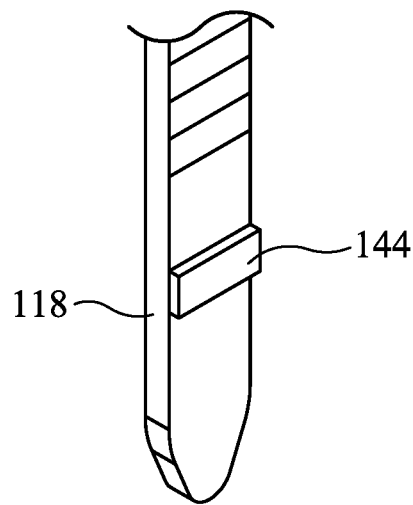
FIGS. 20A and 20B show a perspective and plan view of an embodiment having positioning detents in a single raised rectilinear, square, rectangle, etc. shape, in a strap having raised teeth.
Figure 20B:
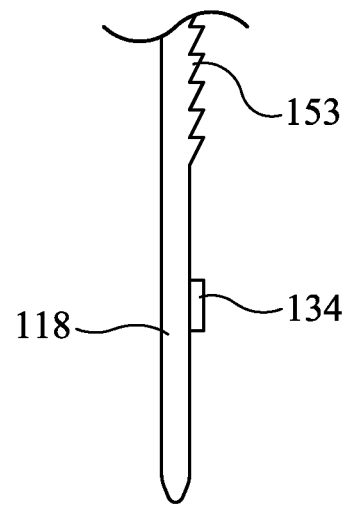

FIGS. 20A and 20B show a perspective and plan view of an embodiment of the detent tab 118 having a raised positioning detent 134 in a single raised rectilinear, square, rectangle, etc. shape 144, in a strap having raised teeth 153.

Figure 21A:
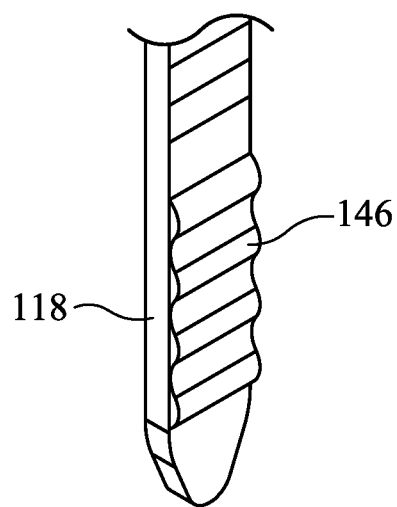
FIGS. 21A and 21B show a perspective and plan view of an embodiment having positioning detents in a series (4) of raised wave or sinusoidal shapes, in a strap having raised teeth.
Figure 21B:
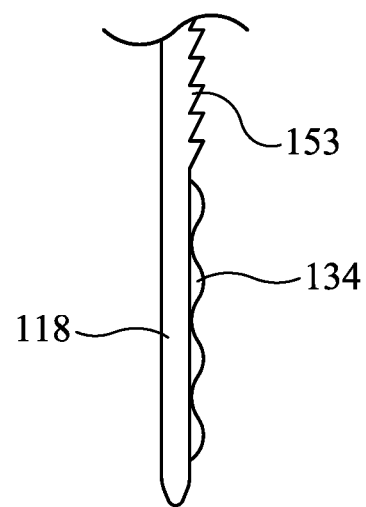

FIGS. 21A and 21B show a perspective and plan view of an embodiment of the detent tab 118 having raised positioning detents 134 in a series (4) of raised wave or sinusoidal shapes 146, in a strap having raised teeth 153.

Figure 22A:
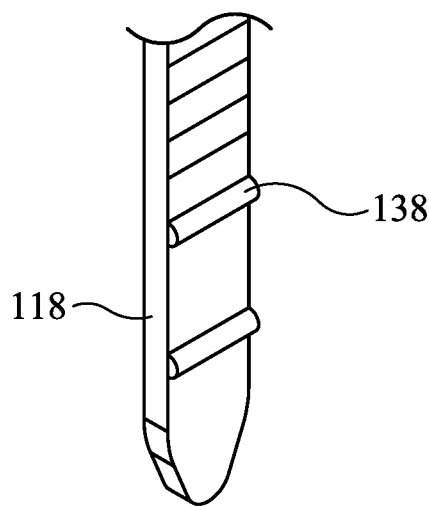
FIGS. 22A and 22B show a perspective and plan view of an embodiment having positioning detents in a pair or series of irregularly space raised hemispherical shapes, in a strap having raised teeth.
Figure 22B:
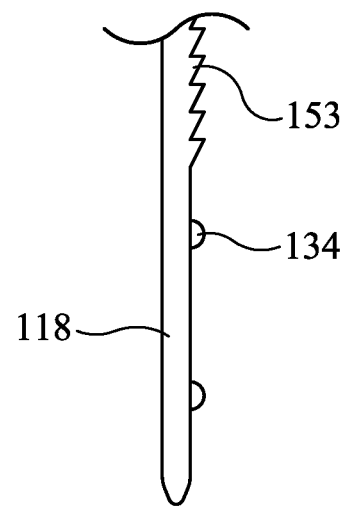

FIGS. 22A and 22B show a perspective and plan view of an embodiment of the detent tab 118 having raised positioning detents 134 in a pair or series of irregularly space raised hemispherical shapes 138, in a strap having raised teeth 153.

Figure 23A:
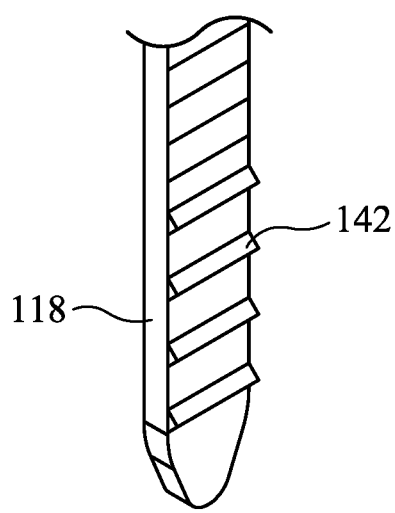
FIGS. 23A and 23B show a perspective and plan view of an embodiment having positioning detents in a series (4) of raised triangular shapes, in a strap having raised teeth.
Figure 23B:
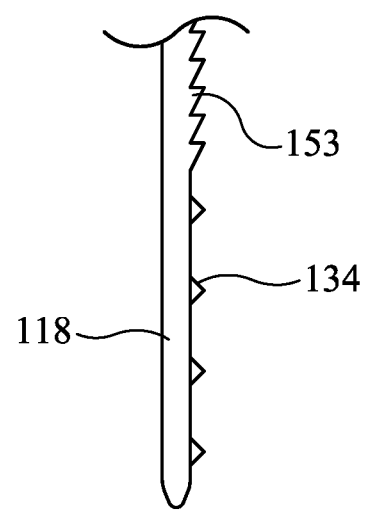

FIGS. 23A and 23B show a perspective and plan view of an embodiment of the detent tab 118 having raised positioning detents 134 in a series (4) of raised triangular shapes 142, in a strap having raised teeth 153.

Figure 24A:
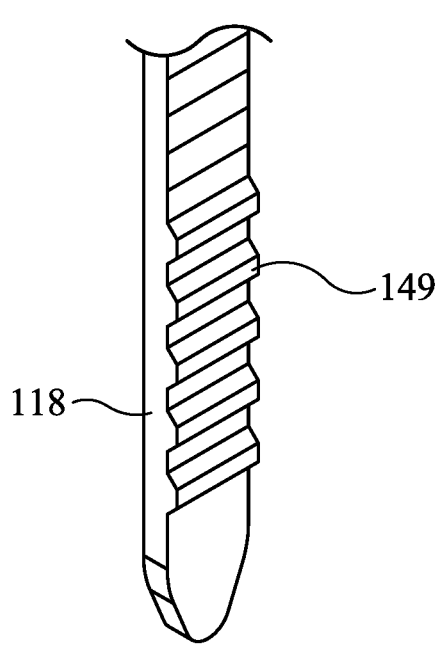
FIGS. 24A and 24B show a perspective and plan view of an embodiment having positioning detents in a series (5) of raised trapezoidal shapes, in a strap having raised teeth.
Figure 24B:
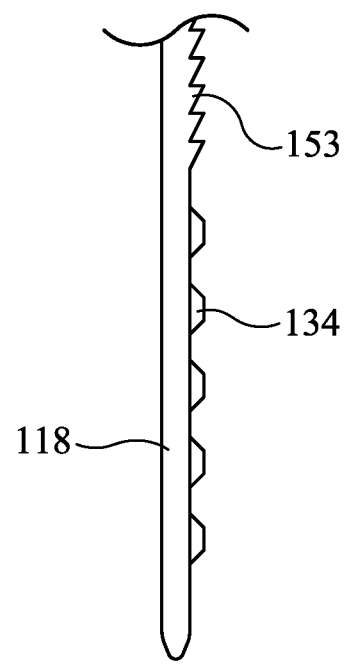

FIGS. 24A and 24B show a perspective and plan view of an embodiment of the detent tab 118 having raised positioning detents 134 in a series (5) of raised trapezoidal shapes 149, in a strap having raised teeth 153.

Figure 25A:
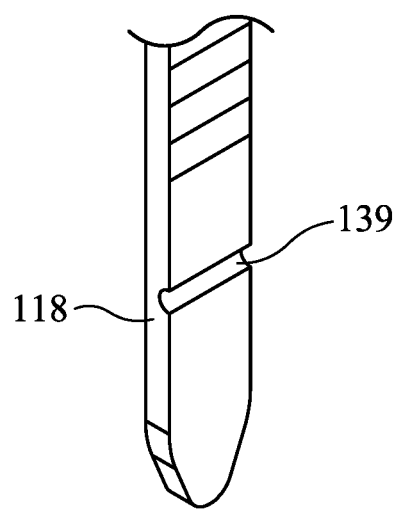
FIGS. 25A and 25B show a perspective and plan view of an embodiment having a single positioning detent as a single hemispherical trough, in a strap having recessed teeth.
Figure 25B:
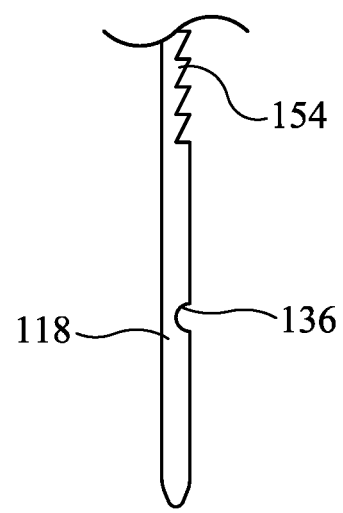

FIGS. 25A and 25B show a perspective and plan view of an embodiment of the detent tab 118 having a single recessed positioning detent 136 as a single hemispherical trough 139, in a strap having recessed teeth 154.

Figure 26A:
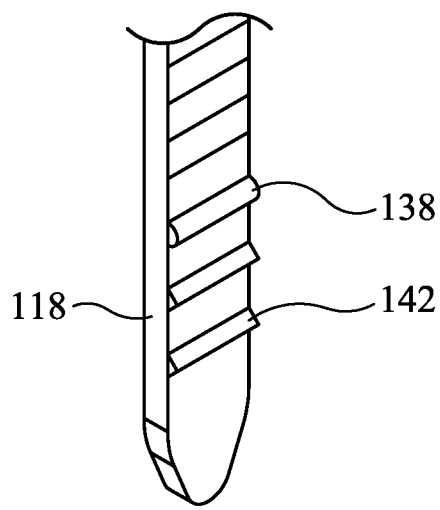
FIGS. 26A and 26B show a perspective and plan view of an embodiment having positioning detents in a series (3) of mixed raised shapes, in a strap having raised teeth.
Figure 26B:
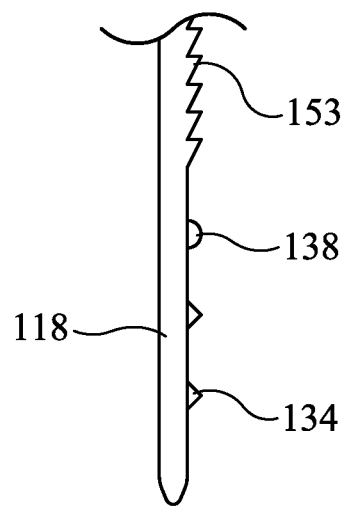

FIGS. 26A and 26B show a perspective and plan view of an embodiment of the detent tab 118 having raised positioning detents 134 in a series (3) of mixed raised shapes 138, 142, in a strap having raised teeth 153.

Figure 27A:
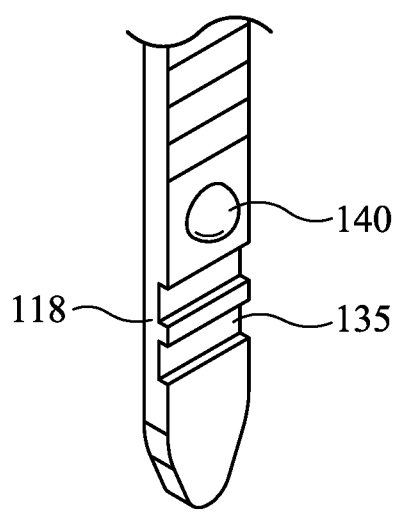
FIGS. 27A and 27B show a perspective and plan view of an embodiment having positioning detents in a series (3) of mixed raised and concave shapes, in a strap having recessed teeth.
Figure 27B:
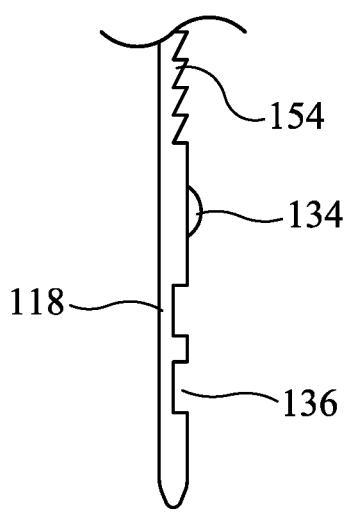

FIGS. 27A and 27B show a perspective and plan view of the detent tab 118 having both raised 134 and recessed 136 positioning detents in a series (3) of mixed raised and concave shapes 135, 140, in a strap having recessed teeth 154.

FIGS. 28A and 28B show a perspective and plan view of an embodiment of the detent tab 118 having raised positioning detents 134 in a series (3) of spaced apart raised rounded shapes 140 in a strap having recessed teeth 154.

FIGS. 29A and 29B show a perspective and plan view of an embodiment of the detent tab 118 having positioning detents 137 in a series (5) of raised wave or sinusoidal shapes 151 and located on the edge 158 of the strap rather than the inner surface 155 of the strap.

Figure 30A:
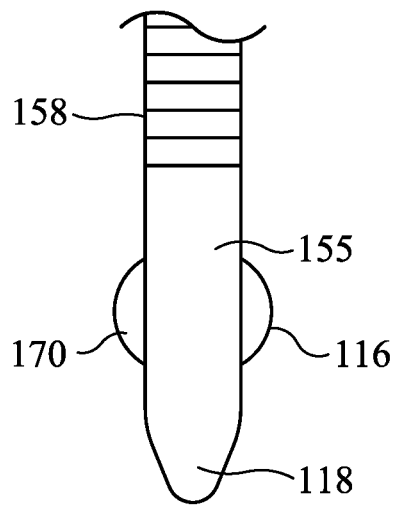
FIGS. 30A, 30B, 30C and 30D show a top view, a perspective view, a first cross-sectional view ad a second cross-sectional view of an embodiment of the detent tab having positioning detents configured as one or more wing components attached to the edge of the strap rather than the inner surface of the strap.
Figure 30B:
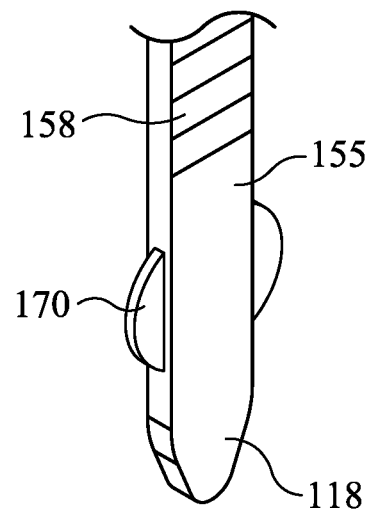
Figure 30C:
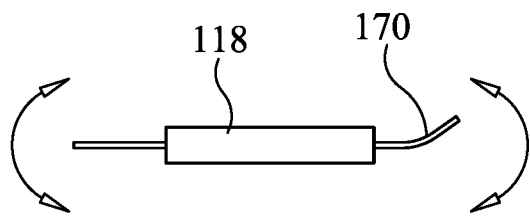
Figure 30D:
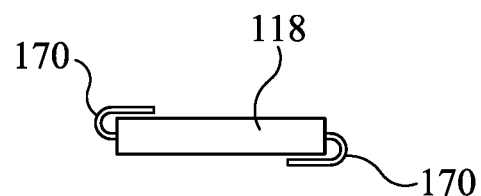

FIGS. 30A, 30B, 30C and 30D show a top view, a perspective view, a first cross-sectional view ad a second cross-sectional view of an embodiment of the detent tab 118 having positioning detents 116 configured as one or more wing components 170 attached to the edge 158 of the strap rather than the inner surface 155 of the strap. FIG. 30C illustrates how the wing component 170 may be flexible and able to move aside when the detent tab 118 is inserted into the receiver. FIG. 30D illustrates how the wing 170 elastically deforms and collapses to facilitate travel through the aperture of the receiver and how it can elastically re-extend to create a detent tab 118 that engages the receiver to allow the user to create with a single hand a temporary positioning loop around the cable etc. to be gathered. This temporary positioning loop allows the user to remove the gathering hand and grasp the detent tab as it extends out from the receiver with the strap located within the receiver, and pull on the strap to complete the tie-off process with a single hand.

Although exemplary and preferred aspects and embodiments of the present invention and forming methods have been described with a full set of features, it is to be understood that the disclosed container and method of manufacture may be practiced successfully without the incorporation of each of those features. The scope of the present invention is not limited only to the tamper-resistant/evident containers and methods of manufacture disclosed herein. Thus, it is to be understood that modifications and variations may be utilized without departure from the spirit and scope of the invention and method disclosed herein, as those skilled in the art will readily understand. Such modifications and variations are considered to be within the purview and scope of the appended claims and their equivalents.

The invention claimed is:

1. A method of single-handed binding using a hybrid zip-tic fastener, comprising the steps:
    (i) providing a one piece hybrid fastener, said hybrid fastener comprising:
        (a) a pre-curled elongate flexible strap ranging in length from 5 mm-200 mm, a width from 0.5 cm-5.0 cm, and a thickness from 0.05 cm-0.5 cm, having a tab end and a receiver end,
        wherein the curl of the elongate flexible strap puts the tab end in proximity to the receiver end;
        (b) a plurality of non-reversible locking teeth disposed on a top surface of the elongate flexible strap,
        wherein the non-reversible locking teeth comprise transversely arranged abutments disposed along at least a portion of the elongate flexible strap away from the tab end, and
        wherein the locking teeth extend transversely across the entire top surface of the elongate flexible strap;
        (c) a plurality of positioning detents disposed on the top surface of the tab end of the elongate flexible strap; and
        (d) a receiver head at the receiver end of the elongate flexible strap, the receiver head having a frame defining a tapered funnel-shaped mouth leading to an inner aperture and a pawl that extends partially into the inner aperture, the tapered funnel-shaped mouth having an opening with a width larger than the width of the elongate strap and tapering to a width of the inner aperture configured to fit the elongate flexible strap, the pawl disposed within the inner aperture and configured to releasably engage the plurality of positioning detents and to lock against the plurality of non-reversible locking teeth;

wherein when the tab end of the elongate flexible strap is inserted into the receiver head to form a loop with the elongate flexible strap, the plurality of positioning detents releasably engage the pawl, and when the elongate flexible strap is inserted further into the receiver head, the plurality of non-reversible locking teeth are configured to lock against the pawl;

(ii) holding the hybrid fastener with a single hand in the shape of a loop with the tab end near the receiver head;

(iii) enclosing the hybrid fastener at a first location around a bundle of wires, hoses, or tubes, wherein the bundle is enclosed within the curl of the pre-curled elongate strap using the single hand;

(iv) inserting the tab end of the pre-curled elongate strap into the tapered funnel-shaped mouth of the receiver head with the top surface facing the pawl, wherein the tab end is inserted into the tapered funnel-shaped mouth using the single hand;

(v) extending for a first distance the tab end of the pre-curled elongate strap into the tapered funnel-shaped mouth of the receiver head, wherein the first distance is where the pawl engages the plurality of positioning detents, wherein the tab end is extended into the tapered funnel-shaped mouth using the single hand;

(vi) moving the hybrid fastener from the first location to a second location on the bundle of wires, hoses, or tubes, wherein the hybrid fastener is moved using the single hand; and, (vii) extending for a second distance the tab end of the pre-curled elongate strap into the tapered funnel-shaped mouth of the receiver head, wherein the second distance is where the pawl engages the plurality of non-reversible locking teeth and the bundle is bound, wherein the tab end is extended to the second position using the single hand.

2. The method of claim 1, wherein the plurality of positioning detents are configured to have a profile shape selected from a hemispherical-button profile, a cylindrical-button profile, a circular profile, a parabolic profile, a triangular profile, a flat-topped profile, a sinusoidal profile, a channeled profile, a complex curvilinear profile, and a polygonal profile.

3. The method of claim 1, wherein at least one positioning detent is a raised detent.

4. The method of claim 1, wherein at least one positioning detent is a recessed detent.

5. The method of claim 1, wherein the inner aperture is funnel-shaped in a single planar axis.

6. The method of claim 1, wherein the inner aperture is funnel-shaped in a first planar axis and funnel shaped in a second planar axis, defining a vortex shape.

7. The method of claim 1, wherein the non-reversible locking teeth extend along a majority of the strap.

8. The method of claim 1, wherein the elongated flexible strap ranges from 5 mm-100 mm in length.

9. The method of claim 1, wherein the elongated flexible strap is constructed of thermo plastic polymer, metal, fibers, or combinations thereof.

10. The method of claim 1, wherein the elongated flexible strap is constructed of a polymer selected from the group consisting of: nylon, polyurethane, polyester, low density polyethylene, high density polyethylene, ultra-high molecular weight polyethylene, polyethylene terephthalate, polypropylene, polystyrene, polyvinyl chloride, polylactic acid, polychlorotrifluoroethylene, polyacrylonitrile, aromatic polyester, liquid crystal polymer, natural rubber, synthetic rubber such as neoprene and butadiene rubber, silicone, polysiloxane, block co-polymer, composite polymer, impregnated polymer, and combinations thereof.

11. The method of claim 1, wherein the elongated flexible strap is constructed of a metal selected from the group consisting of: steel, copper, aluminum, tin, titanium, nickel, zinc, and alloys thereof.

12. The method of claim 1, wherein the elongated flexible strap is constructed of a stamped metal, a cut metal, rolled sheet metal, or metal fibers.

13. The method of claim 1, wherein the elongated flexible strap is constructed of fibers, fibers incorporated into a structural matrix, natural fibers, cellulosic fibers extracted from hemp, cotton, plant leaves, wood or stems, glass fibers, silica fibers, ceramic fibers, metal fibers, and combinations thereof.

14. The method of claim 1,
wherein the positioning detents are selected from the group consisting of: a raised button shaped positioning detent, a raised block shape positioning detent, a raised wave shaped positioning detent, a triangular shaped positioning detent, a trapezoidal shaped positioning detent, a rounded arch shaped positioning detent, a recessed bowl positioning detent, a recessed cylinder positioning detent, a concave hemispherical trough positioning detent, a concave rounded trough positioning detent, a triangular trough positioning detent, a concave transverse channel positioning detent, a concave rounded inverted arch positioning detent, a single rectilinear positioning detent, a recessed shaped positioning detent, an irregularly spaced raised shape positioning detent, a series of mixed raised shape positioning detents, a series of mixed raised and concave shape positioning detents, a series of raised rounded shape positioning detents and recessed teeth, a sinusoidal positioning detent located at the edge of the strap, and a wing shape positioning detent located along the edge of the strap.

15. The method of claim 1, wherein the elongate flexible strap is constructed of metal selected from the group consisting of steel, copper, aluminum, tin, titanium, nickel, zinc, and nickel-titanium alloy.

16. The method of claim 1, wherein the elongate flexible strap is constructed of polymer or polymer having fiber incorporated in the structural matrix.

17. The method of claim 1, wherein the plurality of rounded detents are made of the same or a different material than the elongate flexible strap.

* * * * *